(12) United States Patent
McCormack et al.

(10) Patent No.: US 7,635,227 B2
(45) Date of Patent: *Dec. 22, 2009

(54) CABLE CONNECTION APPARATUS

(75) Inventors: Patrick McCormack, Costa Mesa, CA (US); Robert Ralph Heinze, San Clemente, CA (US)

(73) Assignee: Quantum Corporation, San Jose, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 12/025,289

(22) Filed: Feb. 4, 2008

(65) Prior Publication Data

US 2008/0123281 A1 May 29, 2008

Related U.S. Application Data

(63) Continuation of application No. 11/413,756, filed on Apr. 28, 2006, now Pat. No. 7,350,980.

(51) Int. Cl.
*G02B 6/36* (2006.01)
*G02B 6/00* (2006.01)

(52) U.S. Cl. .................. 385/53; 385/92; 385/134; 385/135; 385/136; 385/94; 385/88; 385/89; 385/139

(58) Field of Classification Search .................. 385/53
See application file for complete search history.

(56) References Cited

U.S. PATENT DOCUMENTS

| | | | |
|---|---|---|---|
| 5,881,454 A | 3/1999 | Baxter | |
| 6,351,343 B1 | 2/2002 | Nakagawa | |
| 6,410,850 B1 | 6/2002 | Abel et al. | |
| 6,830,383 B2 | 12/2004 | Huang | |
| 6,961,238 B2 | 11/2005 | Aketagawa | |
| 7,350,980 B2 * | 4/2008 | McCormack et al. | 385/53 |
| 2004/0190835 A1 | 9/2004 | Burdick et al. | |

* cited by examiner

*Primary Examiner*—Frank G Font
*Assistant Examiner*—Mary A El Shammaa
(74) *Attorney, Agent, or Firm*—Baker Botts L.L.P.

(57) ABSTRACT

An exemplary embodiment provides for a cable connection apparatus wherein a connector is mounted on a disk drive chassis, or a sub-assembly attachable to a chassis, such that a cable that connects to the connector will do so along an axis parallel to the chassis or subassembly that the connector is coupled to as opposed to a more typical perpendicular coupling. As a result, the cable will not stick straight out from the back of the drive and the drive footprint is also reduced.

17 Claims, 9 Drawing Sheets

CABLE CONNECTION APPARATUS

CROSS-REFERENCE TO RELATED APPLICATION

The present application is a continuation of U.S. application Ser. No. 11/413,756, filed Apr. 28, 2006 now U.S. Pat. No. 7,350,980, which is incorporated by reference herein for all purposes.

BACKGROUND

In the rather competitive disk drive industry, smaller drive housings/form-factors are typically a requirement with each passing product development cycle. Due to the continually shrinking drive footprint, the size of the data connector, which plugs into the back of the drive, is increasingly becoming a design issue that requires addressing.

The connector size issue is further compounded when the drive uses a fibre channel-type data interface. Fibre channel cables typically connect to a somewhat bulky and typically rectangular-shaped transceiver that processes light-based signals sent and received along the fibre channel cable. Space issues within a computer or similar enclosure are further compounded in that fibre channel cables can only be bent a certain amount before increased attenuation or breakage of the cable may occur. As a result, increased clearance behind the drive and beyond the transceiver is typically required to ensure ample room for preventing a fibre channel from bending too much.

In light of the foregoing, a need in the art exists for apparatuses and systems that allow for, or facilitate, implementation of a reduced footprint cable connection apparatus.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and apparatuses which are meant to be exemplary and illustrative, not limiting in scope. In various embodiments, one or more of the above-described problems have been reduced or eliminated.

One embodiment by way of non-limiting example provides for a cable connection apparatus such that a connection between a cable and a drive is oriented in a manner perpendicular to the axis or direction along which the drive enclosure or chassis is typically inserted or installed into a host device, such as a computing or data storage system. As a result, the orientation of the connecting components that operably interface the cable to the drive allow for reduction of the drive footprint along at least one axis. Additional embodiments provide for a bend radius limiting tab that is operative to bend the cable outwardly away from the drive, yet maintain a preferred limit on bending to prevent damage to the cable. Additional embodiments further include a stress relief tab that is proximate to the bend radius limiting tab. The stress relief tab abuts against a side of the cable opposite that of the bend radius tab and is operative to provide a stress relief to the cable.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be exemplary and illustrative, not limiting in scope.

Figure 1:
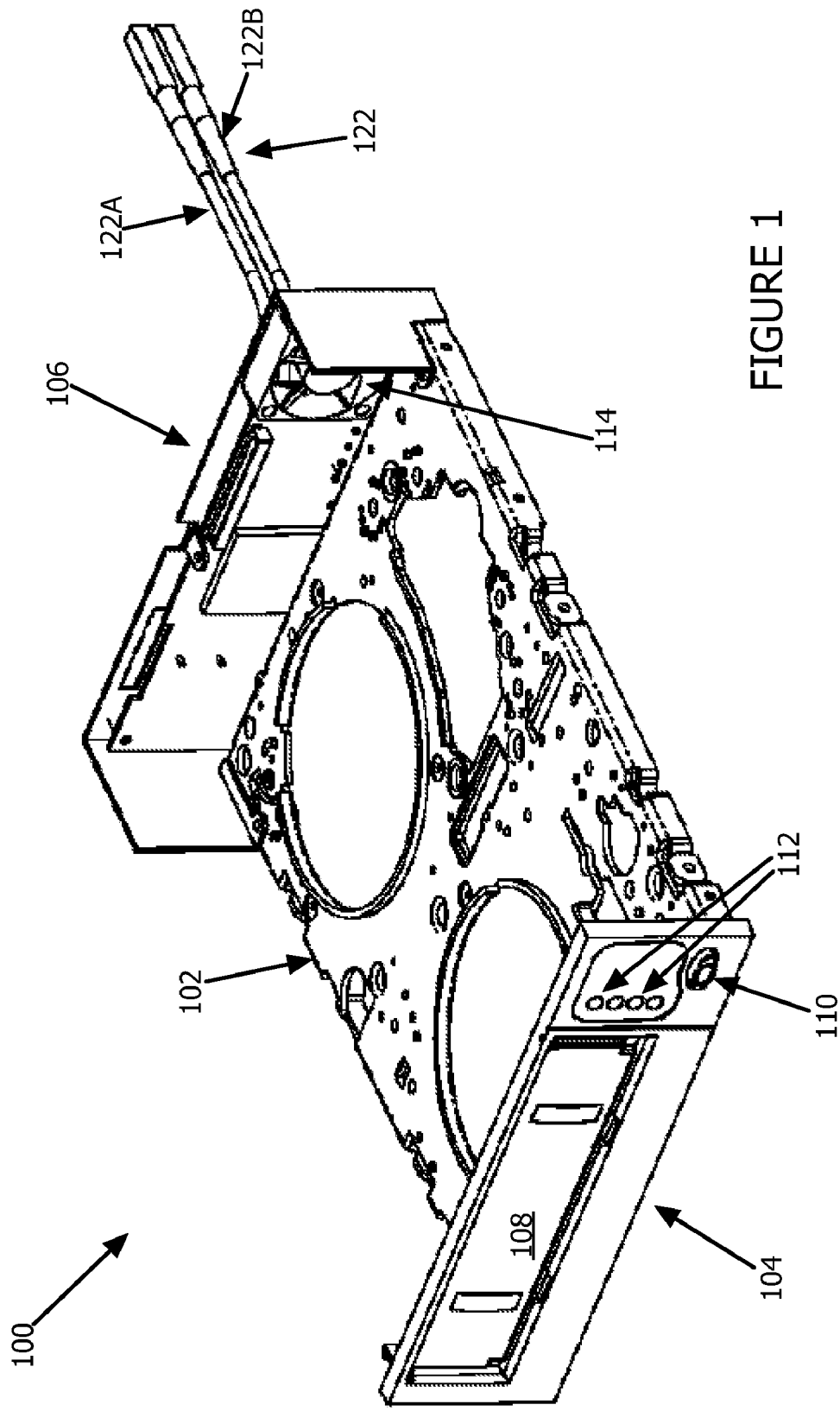
FIGS. 1-2 illustrate isometric views of a typical linear tape-open ("LTO") drive chassis which can be used to implement the claimed embodiments.
Figure 2:
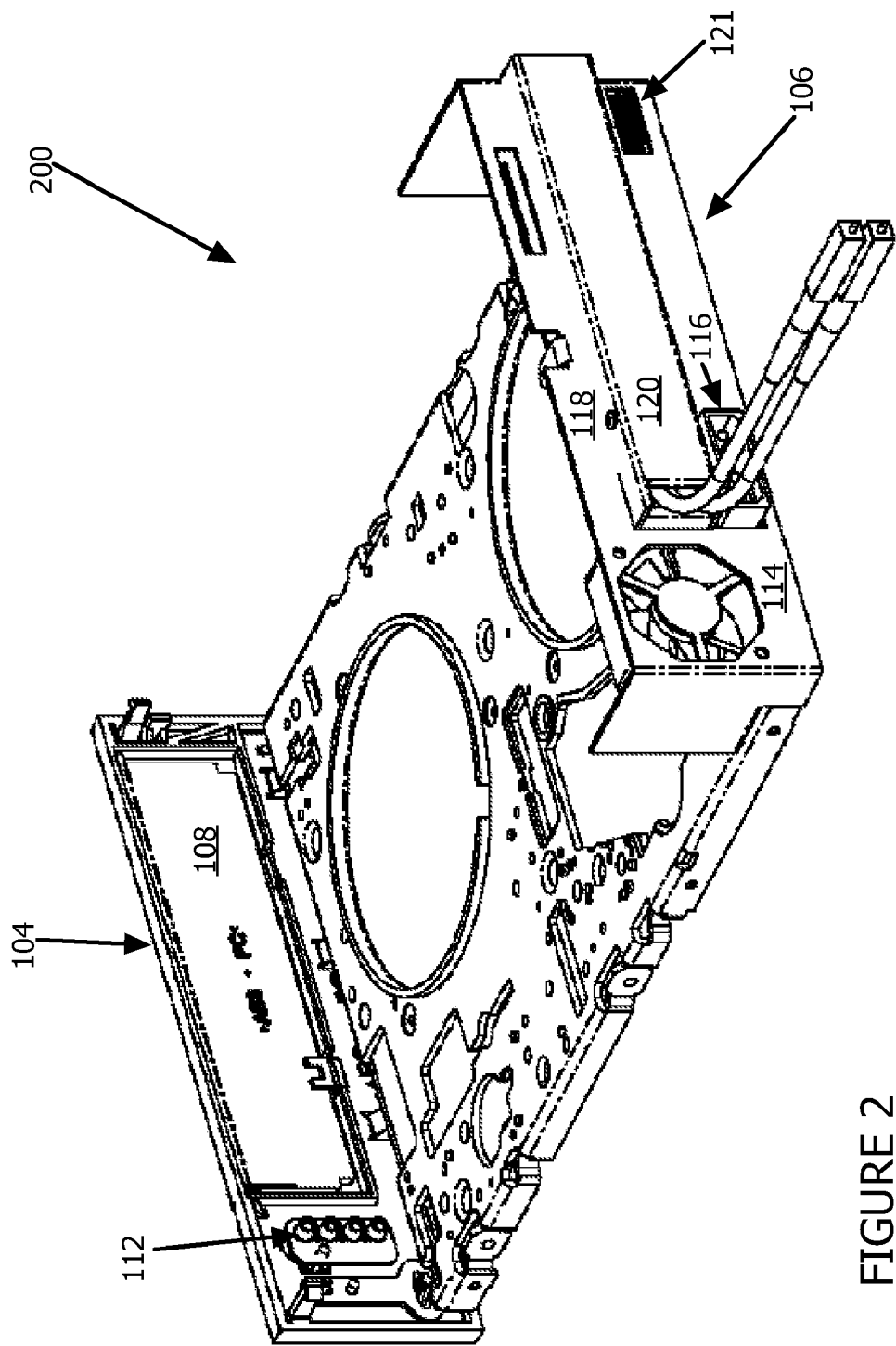

FIGS. 1-2 provide isometric views (100, 200) of a typical linear tape-open ("LTO") drive chassis 102 which can be used to implement the claimed embodiments. Chassis 102 includes a front 104, a back 106 and a base 108. Front 104 further includes a door 108 (through which a tape cartridge (not shown) can be inserted), an eject button 110 to eject the cartridge and various indicator lights 112. The back 106 includes a fan 114 and a sub-assembly 118. Sub-assembly 118 further includes a power plug 116, a drive select ID 121, a transceiver 124 (shown in FIGS. 3-4 and 7-8) and an ID select connector 121. A fibre channel network can have up to 128 drives in a loop and the ID select connector 121 is operative to provide the drive identifier (ID) to a host. The drive ID is set by configuring the pins of connector 121. Fibre channel cable 122 includes two cables 122A and 122B—one for incoming data and another for outgoing data. As can be seen via FIGS. 7-8, the end of fibre channel cable 122 includes a connector 134 adapted to be coupled with transceiver 124, and is attached in a manner parallel to sub-assembly 118, and perpendicular to the axis along which the drive housing is typically inserted into a computing hardware system. As FIG. 2 and other Figs. illustrate, fibre channel cable 122 bends away from sub-assembly 118. How these aspects are accomplished will be detailed via the ensuing figures and description.

Figure 3:
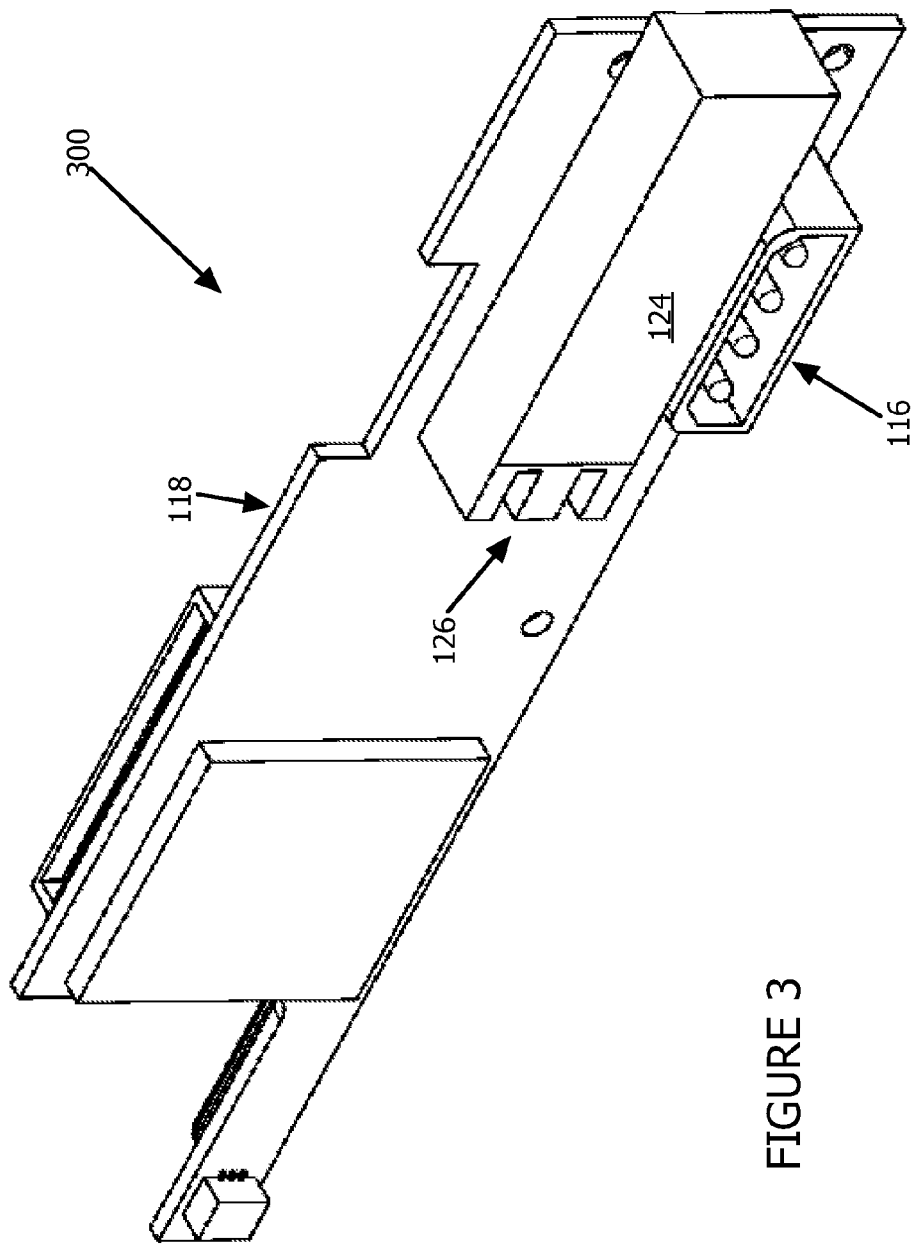
FIGS. 3-5 illustrates various partial views of a sub-assembly attachable to the chassis of FIGS. 1-2, in accordance with an exemplary embodiment.
Figure 4:
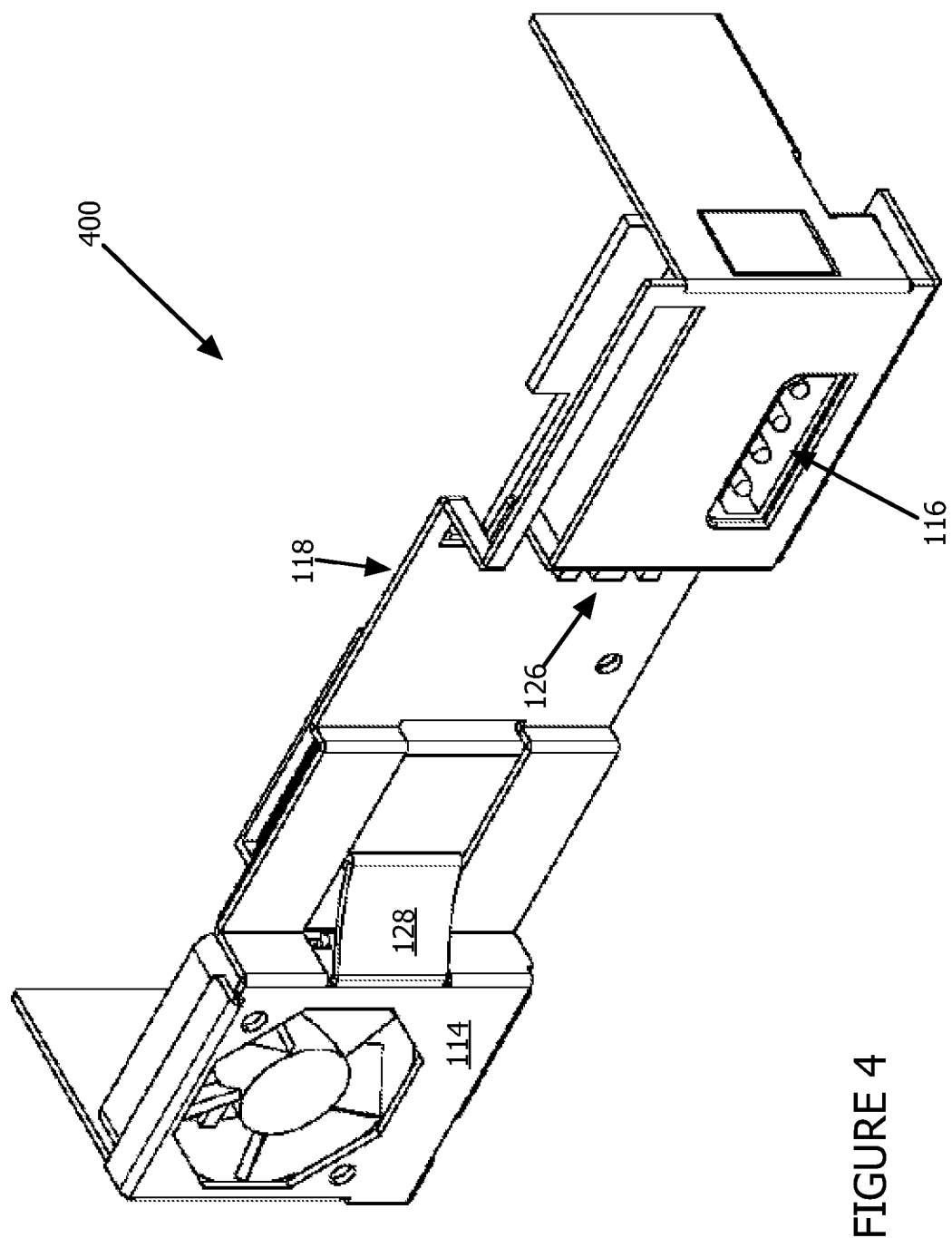
Figure 5:
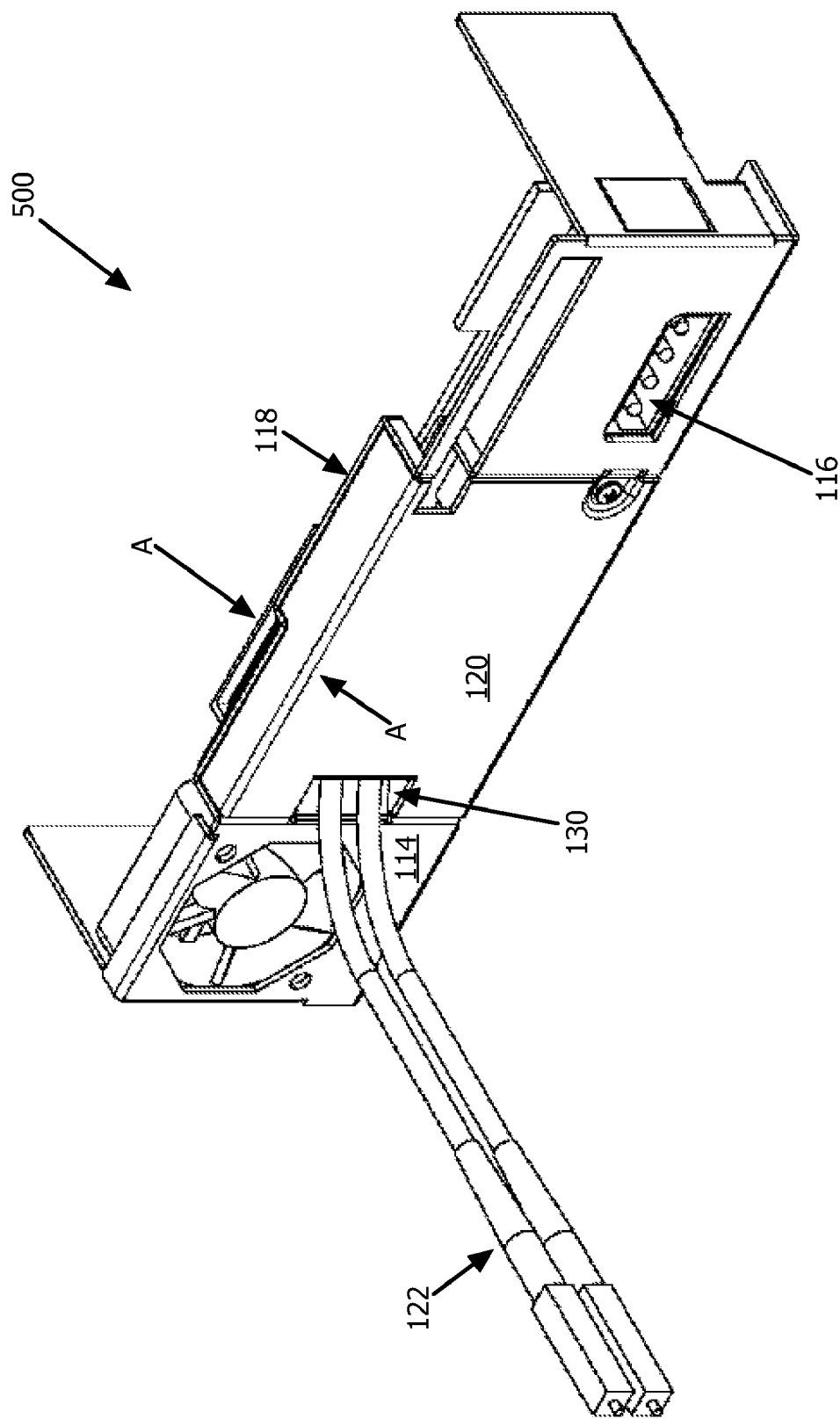
Figure 7:
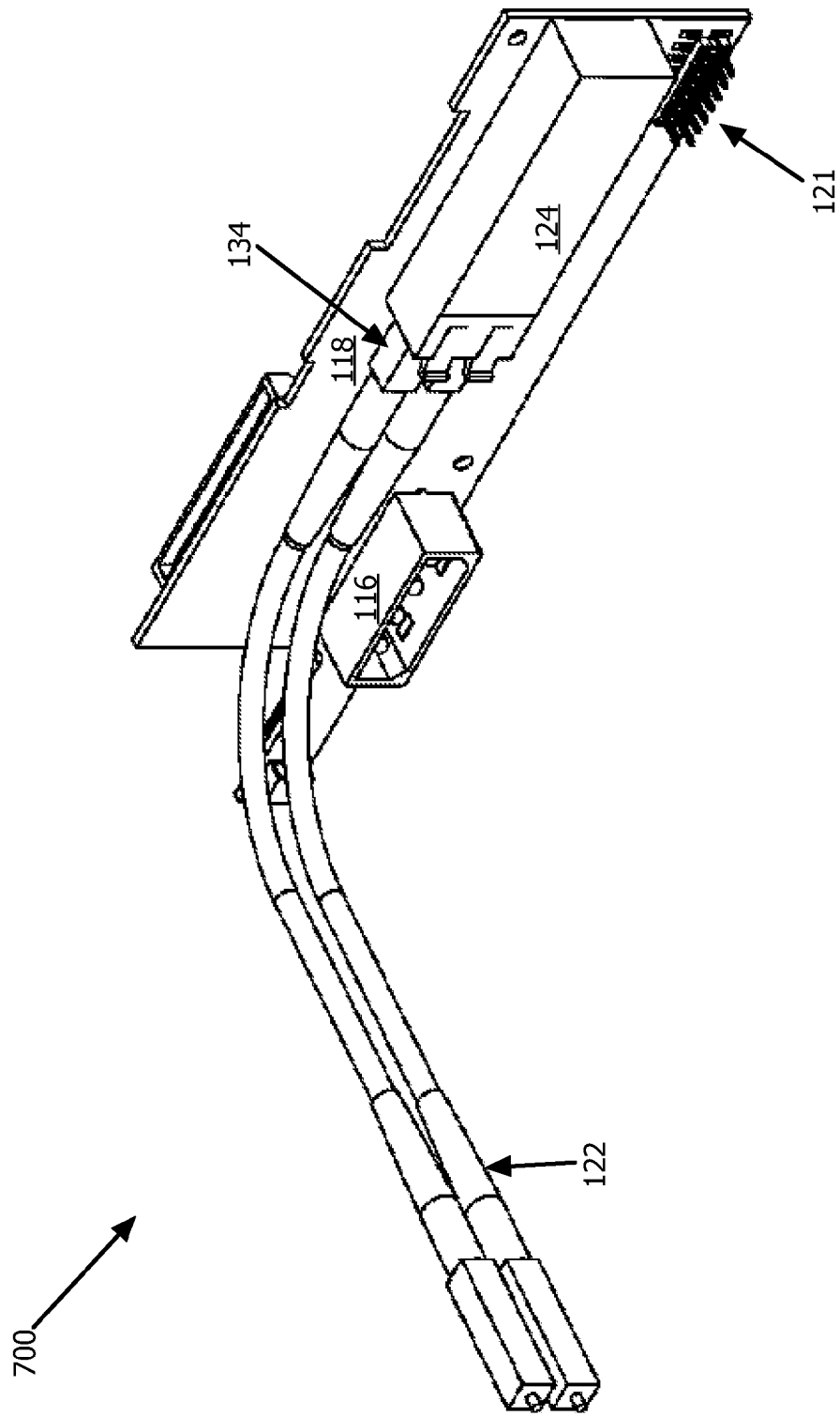
FIGS. 7-9 illustrate an alternate embodiment/various partial views of a sub-assembly attachable to the chassis of FIGS. 1-2, in accordance with an exemplary embodiment.
Figure 8:
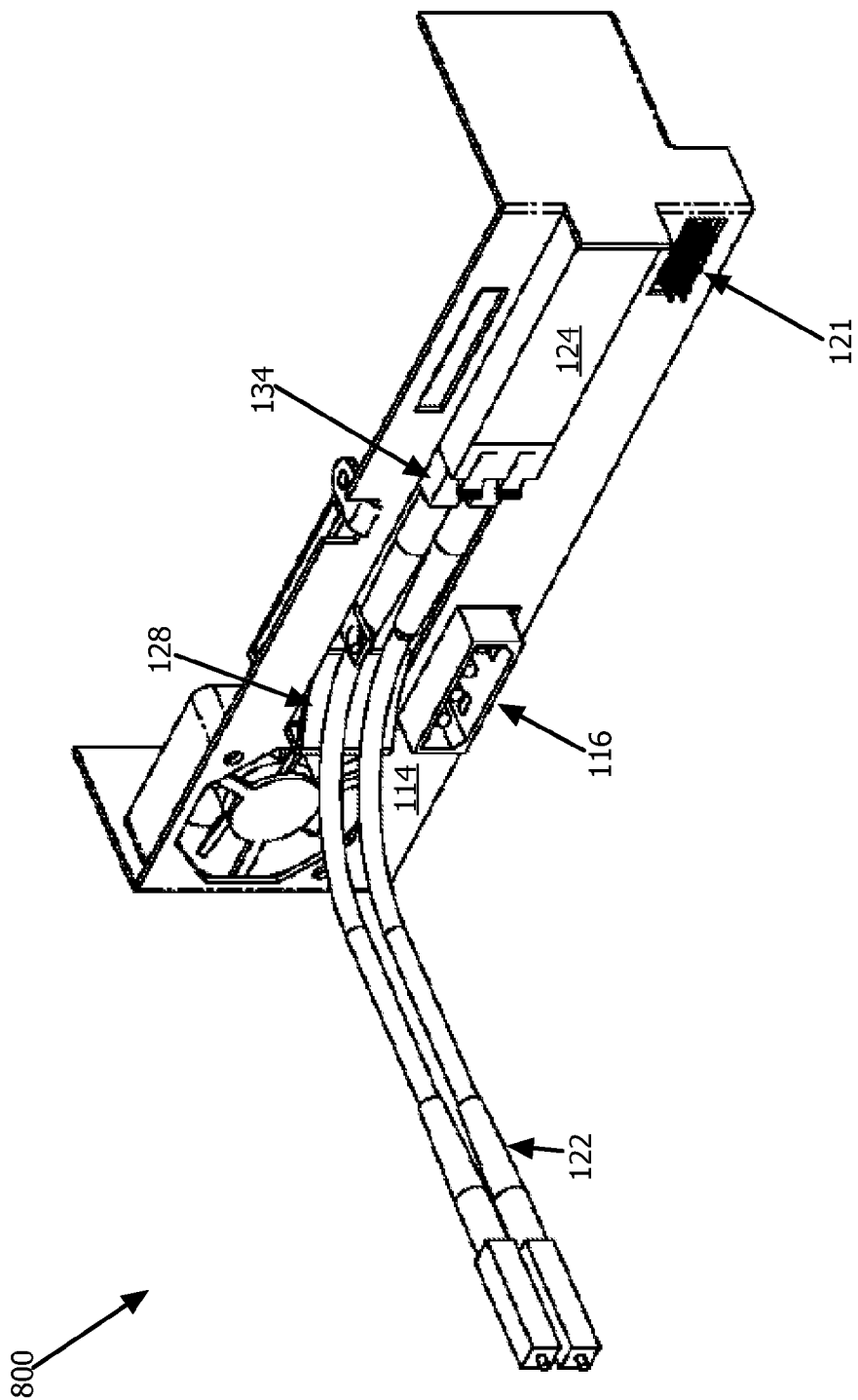
Figure 9:
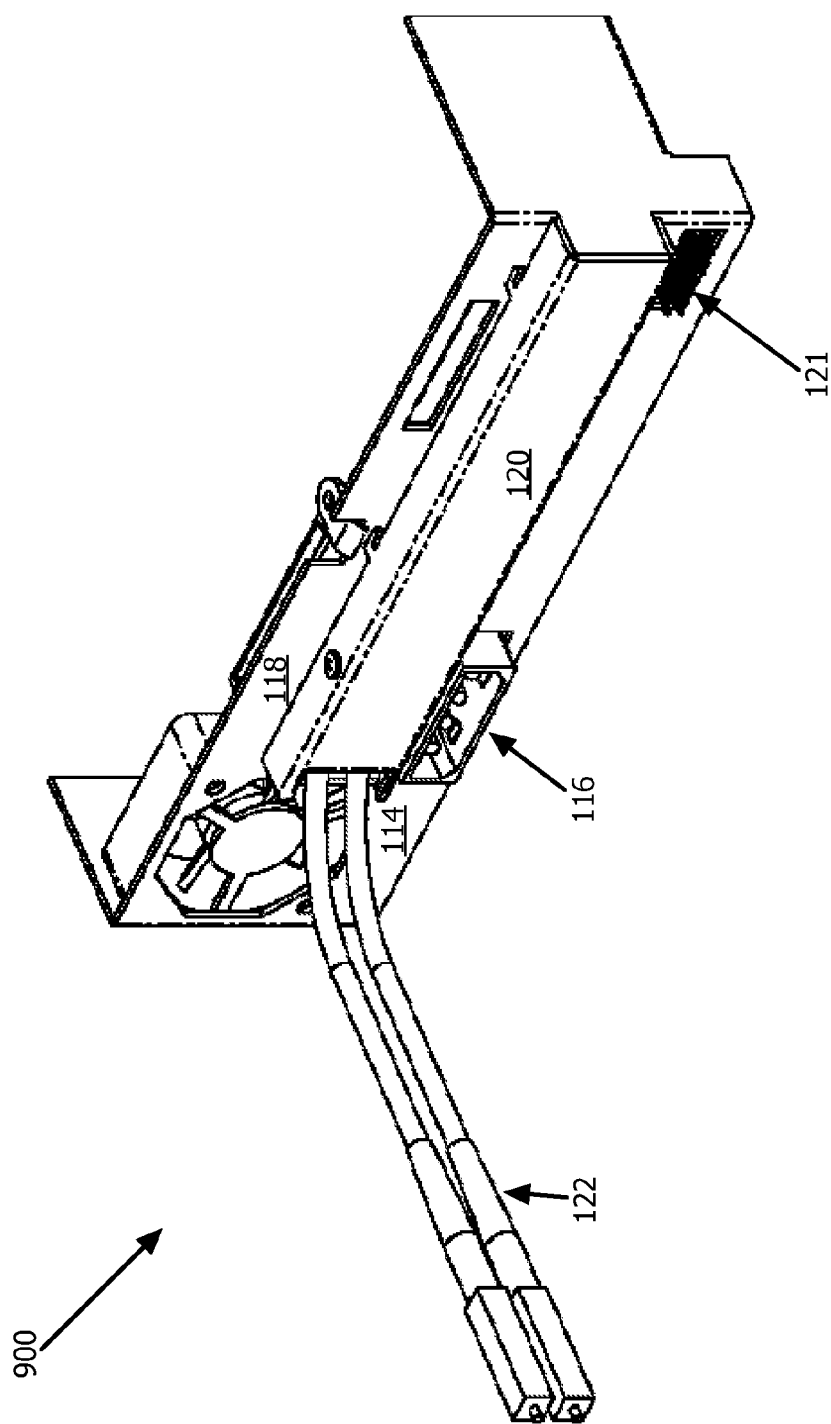

FIGS. 3-5 illustrates various partial views (300, 400 and 500) of the sub-assembly 118 that can be attached to the chassis 102 of FIGS. 1-2, in accordance with an exemplary embodiment. As the Figures illustrate, sub-assembly 118, in one implementation, is generally planar in overall configuration and attaches to chassis 102 along a first axis. In the implementations shown, the first axis is substantially perpendicular to a second axis along which the drive is typically inserted or installed into a computing or data storage system. Referring to FIG. 3, FIG. 3 shows a partial view of sub-assembly 118 that includes a transceiver 124. Transceiver 124 is operative to accept the fibre channel cable 122 at area 126 of transceiver 124, such as shown in view 700 of FIG. 7. Transceiver 124 is further operable to process light signals sent over and received from cable 122. Since transceiver 124 is mounted parallel to sub-assembly 118, the fibre channel cable 122 connects to transceiver 124 along an axis parallel to sub-assembly 118 (and perpendicular to the axis along which the drive is typically installed in a host computing system). Typically, transceiver 124 is mounted on a printed circuit board (PCB) that includes one or more integrated circuits directed to providing a physical and logical interface between the optical signals transmitted across fibre channel cable 122 and the remaining drive controller hardware. It should be noted that views 300, 400 and 500 depict a particular embodiment while views 700, 800 and 900 of FIGS. 7-9 depict an alternative embodiment. Furthermore, FIG. 2 corresponds to the alternative embodiment of views 700, 800 and 900. As there are two embodiments, certain minor structural differences may be noticed.

Referring to view 400 of FIG. 4, view 400 further includes fan 114 and a bend radius limiting tab 128 that is operable to cause cable 122 to bend away from sub-assembly 118 and to further define how much cable 122 will bend away from sub-assembly 118. Typically, a maximum bend radius for a fibre channel cable is defined as 10 to 20 times a diameter of the cable. For the claimed embodiments, a maximum bend radius of 10 times the cable diameter is preferred as it provides for less stress on a given cable while still providing for an acceptable amount of bend. One skilled in the art will recognize that the present invention can be configured to achieve other bend radius values or proportional values relative to cable dimensions. A cable contacting portion of the bend radius limiting tab 128 is typically concavely-shaped.

Figure 6:
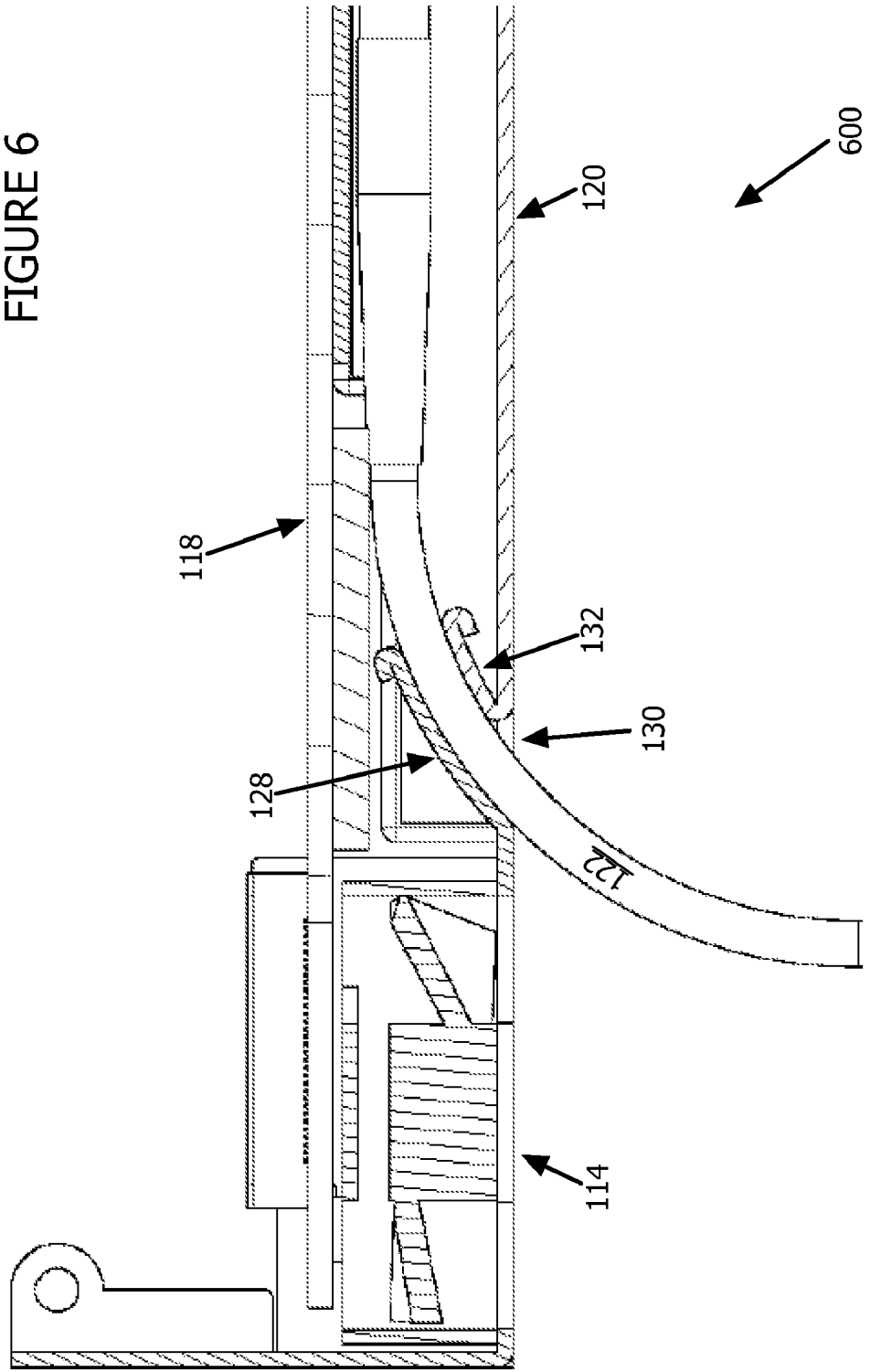
FIG. 6 is a cross-sectional view of FIG. 5 taken along line A-A, in accordance with an exemplary embodiment.

View 500 of FIG. 5 additionally includes the backplate 120 which covers the cable 122 and further includes an opening 130 through which cable 122 exits. Backplate 120 also includes a strain relief tab 132 that abuts cable 122 to provide strain relief to cable 122. Tab 132 can be seen via FIG. 6/view 600 which is a partial cross section of view 500 taken along line A-A. As can be seen via view 600, cable 122 runs partly parallel to sub-assembly 118 and is then guided away from sub-assembly 118 by bend radius limiting tab 128 while tab 132 provides strain relief and also tends to hold cable 122 in place. As FIG. 6 illustrates, tab 132 can also be configured to promote uniform bending of cable along the bending radius defined by tab 128. A cable-contacting portion of the strain relief tab 132 is typically convexly-shaped.

As previously mentioned, FIGS. 7-9 illustrate an alternative embodiment depicted via views 700, 800 and 900. Some of the differences between the two embodiments include placement of power plug 116 and drive ID select 121 elsewhere on chassis 102 relative to the embodiment of FIGS. 3-5. Another difference is that backplate 120 is longer than and not as wide as backplate 120 of FIGS. 3-5. Backplate 120 of FIG. 6 covers part of cable 122 and additionally covers transceiver 124. Backplate 120 as shown in FIG. 6 and does not cover transceiver 124. It should also be noted that, and this is not a difference between the two embodiments, backplate 120 of FIG. 6 also includes a strain relief tab 132. However, tab 132 is not visible in FIG. 6.

While the claimed embodiments have been described in terms of a sub-assembly that can be attached to a chassis, those claimed embodiments are not limited to such a configuration. For example, the sub-assembly could be integral with the chassis. Additionally, the backplate could also be made integral with the chassis or sub-assembly depending on the configuration. Furthermore, a transceiver or other cable connector could be mounted on other parts of a drive. For example, the transceiver could be mounted in a parallel fashion on the top, bottom or perhaps even the sides of a drive enclosure. Furthermore, although the embodiments discussed above are illustrated in connection with a tape drive, the present invention can be incorporated into a variety of drive types, such as disk drives, transfer stations operable with removable disk drives, CD and DVD drives, and the like.

Advantageously, the claimed embodiments provide for a reduced drive footprint via a simple and elegant solution of turning a connector such that it mounts in a parallel fashion to a side of a disk drive enclosure, and in a manner perpendicular to the axis or direction along which the drive is typically inserted or installed into a housing. Additionally, radius limiting and strain relief tabs operate to control and protect a fibre channel type cable that can only be bent a certain amount as the cable egresses from a drive enclosure.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A fibre channel cable connection apparatus comprising:
   a sub-assembly attachable to a drive chassis along a first axis, wherein the first axis is substantially perpendicular to a second axis along which the drive chassis is installed into a host device;
   a fibre-channel transceiver, oriented substantially parallel to the first axis, configured to connect with a first end of a fibre channel cable such that the first end of the fibre channel cable is oriented substantially parallel to the first axis, and wherein the fibre-channel transceiver is coupled to the sub-assembly; and
   means for bending the fibre channel cable in a direction substantially perpendicular to the first axis that is coupled to the sub-assembly adjacent to the fibre-channel transceiver.

2. The fibre channel cable connection apparatus as recited in claim 1 further comprising a backplate including an opening for the fibre channel cable, and comprising means for relieving strain on the fibre channel cable as the fibre channel cable egresses out of the opening.

3. The fibre channel connection apparatus as recited in claim 2 wherein the sub-assembly is a side of the chassis.

4. The fibre channel connection apparatus as recited in claim 2 wherein the means for bending includes a concavely-shaped bend radius tab.

5. The fibre channel connection apparatus as recited in claim 2 wherein the means for relieving comprises a convexly-shaped member.

6. The fibre channel connection apparatus as recited in claim 1 wherein the sub-assembly is attachable to a back end of the chassis.

7. The fibre channel connection apparatus as recited in claim 1 wherein the sub-assembly is attachable to a side of the chassis that is not the back end of the chassis.

8. A fibre channel cable connection apparatus comprising:
   a sub-assembly attachable to a drive chassis along a first axis, wherein the first axis is substantially perpendicular to a second axis along which the drive chassis is installed into a host device;
   a fibre-channel transceiver, oriented substantially parallel to the first axis, configured to connect with a first end of a fibre channel cable such that the first end of the fibre channel cable is oriented substantially parallel to the first axis wherein the fibre-channel transceiver is coupled to the sub-assembly; and
   a bend radius limiting member coupled to the sub-assembly adjacent to the fibre-channel transceiver wherein the bend radius limiting member comprises a cable-contacting face configured to bend the fibre channel cable in a direction substantially perpendicular to the first axis.

9. The fibre channel cable connection apparatus as recited in claim 8 further comprising a backplate coupled with the sub-assembly wherein the backplate includes a strain relief member proximate to the bend radius limiting member, and wherein the strain relief member forms an opening in conjunction with the bend radius limiting member such that the cable egresses out of the opening.

10. The fibre channel connection apparatus as recited in claim 9 wherein the sub-assembly is a side of the chassis.

11. The fibre channel connection apparatus as recited in claim 9 wherein a cable-contacting portion of the bend radius limiting member is concavely-shaped.

12. The fibre channel connection apparatus as recited in claim 11 wherein a cable-contacting portion of the strain relief member is convexly-shaped.

13. The fibre channel connection apparatus as recited in claim 9 wherein a cable-contacting portion of the bend radius limiting member is concavely-shaped and wherein a cable-contacting portion of the strain relief member is convexly-shaped.

14. A cable connection apparatus comprising:
a sub-assembly of a chassis;
a connector configured to connect with a cable wherein the connector is coupled to the sub-assembly such that the cable is operable to connect with the connector along an axis parallel to the sub-assembly;
a bend radius limiting member coupled to the sub-assembly and adjacent to the connector wherein the bend radius limiting member comprises a cable-contacting face configured to bend the cable away from the sub-assembly;
a backplate coupled with the sub-assembly wherein the backplate includes a strain relief member proximate to the bend radius limiting member, and wherein the strain relief member forms an opening in conjunction with the bend radius limiting member such that the cable egresses out of the opening.

15. The cable connection apparatus as recited in claim 14 wherein a cable-contacting portion of the bend radius limiting member is concavely-shaped.

16. The cable connection apparatus as recited in claim 14 wherein a cable-contacting portion of the strain relief member is convexly-shaped.

17. The cable connection apparatus as recited in claim 14 wherein a cable-contacting portion of the bend radius limiting member is concavely-shaped and wherein a cable-contacting portion of the strain relief member is convexly-shaped.

\* \* \* \* \*